(12) United States Patent
Kilchyk et al.

(10) Patent No.: US 12,553,445 B2
(45) Date of Patent: Feb. 17, 2026

(54) GEARED AIR CYCLE MACHINE FAN FOR AIRCRAFT SYSTEMS

(71) Applicant: Hamilton Sundstrand Corporation, Charlotte, NC (US)

(72) Inventors: Viktor Kilchyk, Lancaster, NY (US); Brent J. Merritt, Southwick, MA (US); Matthew L. Pess, West Hartford, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 418 days.

(21) Appl. No.: 18/168,734

(22) Filed: Feb. 14, 2023

(65) Prior Publication Data
US 2024/0271627 A1    Aug. 15, 2024

(51) Int. Cl.
| | |
|---|---|
| *F04D 25/02* | (2006.01) |
| *B64D 13/06* | (2006.01) |
| *F04D 29/053* | (2006.01) |
| *F04D 29/056* | (2006.01) |
| *F04D 29/40* | (2006.01) |

(Continued)

(52) U.S. Cl.
CPC .......... *F04D 25/026* (2013.01); *B64D 13/06* (2013.01); *F04D 29/053* (2013.01); *F04D 29/056* (2013.01); *F04D 29/403* (2013.01); *F25B 9/004* (2013.01); *F25B 9/06* (2013.01); *B64D 2013/064* (2013.01); *B64D 2013/0648* (2013.01)

(58) Field of Classification Search
CPC .... F04D 25/026; F04D 29/048; F04D 29/058; F04D 29/053; F04D 29/056; F04D 29/403; B64D 13/06; B64D 2013/0648; F25B 9/004; F25B 9/06

See application file for complete search history.

(56) References Cited

U.S. PATENT DOCUMENTS

| | | | | |
|---|---|---|---|---|
| 4,694,654 A | * | 9/1987 | Kawamura | ............. F02B 63/04 310/156.53 |
| 5,572,119 A | | 11/1996 | Taylor | |

(Continued)

FOREIGN PATENT DOCUMENTS

| | | |
|---|---|---|
| CN | 216269938 U | 4/2022 |
| EP | 1471002 A1 | 10/2004 |

OTHER PUBLICATIONS

Extended European Search Report for EP Application No. 24157178.5, dated Jul. 2, 2024, pp. 1-9.

(Continued)

*Primary Examiner* — Miguel A Diaz
(74) *Attorney, Agent, or Firm* — CANTOR COLBURN LLP

(57) ABSTRACT

Aircraft air cycle machines include a housing, a shaft arranged within the housing, and a first wheel assembly operably coupled to the shaft and arranged within the housing. The first wheel assembly is configured to rotationally drive the shaft. A second wheel assembly is operably coupled to the shaft and configured to be rotationally driven by the shaft. A magnetic assembly is arranged within the housing and along the shaft. The magnetic assembly includes a stator assembly fixedly connected to the housing and a rotor assembly rotationally coupled to the shaft. The magnetic assembly is arranged along the shaft to provide a gear ratio between the first wheel assembly and the second wheel assembly.

20 Claims, 6 Drawing Sheets

(51) Int. Cl.
  *F25B 9/00* (2006.01)
  *F25B 9/06* (2006.01)

(56) References Cited

U.S. PATENT DOCUMENTS

| | | |
|---|---|---|
| 5,709,103 A | 1/1998 | Williams |
| 5,726,560 A | 3/1998 | Eakman et al. |
| 6,058,715 A | 5/2000 | Strang et al. |
| 6,735,953 B1 | 5/2004 | Wolfe et al. |
| 7,723,883 B2 * | 5/2010 | Ozaki .................. H02K 5/1732 |
| | | 310/90.5 |
| 8,347,648 B2 | 1/2013 | Nakazeki et al. |
| 10,174,767 B2 | 1/2019 | Pal |
| 2009/0127956 A1 | 5/2009 | Ozaki et al. |
| 2016/0087517 A1 | 3/2016 | Powell et al. |

OTHER PUBLICATIONS

Funde et al., "Magnetic Power Transmission", International Conference on Ideas, Impact and Innovation in Mechanical Engineering, vol. 5, Issue 6, Jun. 2017, pp. 1600-1606.

Paudel, Nirmal "Modeling Magnetic Gears in COMSOL Multiphysics", COMSOL Blog, pp. 1-11, retrieved Aug. 1, 2025, retrieved from https://www.comsol.com/blogs/modeling-magnetic-gears-in-comsol-multiphysics/.

European Official Letter for Application No. 24157178.5, mailed Aug. 11, 2025, 5 pages.

\* cited by examiner

GEARED AIR CYCLE MACHINE FAN FOR AIRCRAFT SYSTEMS

BACKGROUND

The subject matter disclosed herein generally relates to aircraft machines and, more particularly, to geared air cycle machine fans for aircraft systems.

Aircraft are configured with multiple electromechanical machines that are used to generate power, perform work, generate or treat air or other fluids for use onboard the aircraft, and the like. For example, environmental control systems (ECS) provide a supply of conditioned air to an enclosure, such as an aircraft cabin and/or cockpit. An air cycle machine (ACM) is an integral part of the ECS. Conventional ACMs include at least two turbines and a compressor mounted along a common axis. The turbines and compressor are assembled using multiple shaft pieces and held together with a tie rod assembly. For example, the compressor may be mounted as a link between two shaft pieces. The ECS and the ACM may incorporate motors therein to drive operation thereof.

The motors of these components, or other onboard motors, may have bearings to ensure proper operation thereof. The bearings are conventionally mechanical bearings (e.g., thrust bearings, journal bearings, hydrodynamic foil bearings). Such bearings may be subject to damage or contact and thus generate particles that can impact operation and efficiency (or even break the machine). Providing improved motors and machines can lead to improved efficiencies and costs associated with aircraft.

Furthermore, ACMs may consist of one or radially arranged rotors and one or more associated fans. The fan(s) and rotors (e.g., compressor and/or turbines) may have different optimum Ns and rotational speeds for the peak efficiency. Due to thermodynamic system conditions, it has been difficult to design each rotor of an ACM at a peak efficiency (Ns). This results in a significant loss of the performance (e.g. up to 10% of the fan efficiency) and corresponding increase in heat exchanger and overall machine weight. As such, improved ACM systems may address this and other drawbacks of current ACM systems.

SUMMARY

According to some embodiments, aircraft air cycle machines are provided. The aircraft air cycle machines include a housing, a shaft arranged within the housing, a first wheel assembly operably coupled to the shaft and arranged within the housing, wherein the first wheel assembly is configured to rotationally drive the shaft, a second wheel assembly operably coupled to the shaft and configured to be rotationally driven by the shaft, and a magnetic assembly arranged within the housing and along the shaft, wherein the magnetic assembly comprises a stator assembly fixedly connected to the housing and a rotor assembly rotationally coupled to the shaft, wherein the magnetic assembly is arranged along the shaft to provide a gear ratio between the first wheel assembly and the second wheel assembly.

In addition to one or more of the features described herein, or as an alternative, further embodiments of the aircraft air cycle machines may include that the magnetic assembly is an axial flux magnetic assembly.

In addition to one or more of the features described herein, or as an alternative, further embodiments of the aircraft air cycle machines may include that the first wheel assembly is a turbine and the second wheel assembly is a fan.

In addition to one or more of the features described herein, or as an alternative, further embodiments of the aircraft air cycle machines may include that the first wheel assembly is a turbine and the second wheel assembly is a compressor.

In addition to one or more of the features described herein, or as an alternative, further embodiments of the aircraft air cycle machines may include at least one mounting structure arranged to fixedly mount the stator assembly to the housing.

In addition to one or more of the features described herein, or as an alternative, further embodiments of the aircraft air cycle machines may include a controller configured direct electrical power into the stator assembly to generate a magnetic field.

In addition to one or more of the features described herein, or as an alternative, further embodiments of the aircraft air cycle machines may include that the controller is configured to operate in a power input mode of operation to input rotational energy into the shaft.

In addition to one or more of the features described herein, or as an alternative, further embodiments of the aircraft air cycle machines may include that the controller is configured to operate in a power output mode of operation to extract energy from the shaft.

In addition to one or more of the features described herein, or as an alternative, further embodiments of the aircraft air cycle machines may include that the controller is configured to operate in a bearing mode of operation wherein the rotor assembly is rotationally decoupled from the shaft, and the interaction of the rotor assembly and the stator assembly provides a bearing functionality to the shaft.

In addition to one or more of the features described herein, or as an alternative, further embodiments of the aircraft air cycle machines may include that the bearing functionality is at least one of an axial bearing functionality and a radial bearing functionality.

In addition to one or more of the features described herein, or as an alternative, further embodiments of the aircraft air cycle machines may include at least one mechanical bearing arranged on the shaft.

In addition to one or more of the features described herein, or as an alternative, further embodiments of the aircraft air cycle machines may include that the at least one mechanical bearing comprises at least one journal bearing.

In addition to one or more of the features described herein, or as an alternative, further embodiments of the aircraft air cycle machines may include that the at least one mechanical bearing comprises at least one thrust bearing.

According to some embodiments, aircraft environmental control systems are provided. The aircraft environmental control systems include an air cycle machine having a housing, a shaft arranged within the housing, a first wheel assembly operably coupled to the shaft and arranged within the housing, wherein the first wheel assembly is configured to rotationally drive the shaft, a second wheel assembly operably coupled to the shaft and configured to be rotationally driven by the shaft, and a magnetic assembly arranged within the housing and along the shaft, wherein the magnetic assembly comprises a stator assembly fixedly connected to the housing and a rotor assembly rotationally coupled to the shaft, wherein the magnetic assembly is arranged along the shaft to provide a gear ratio between the first wheel assembly and the second wheel assembly.

In addition to one or more of the features described herein, or as an alternative, further embodiments of the aircraft environmental control systems may include that the magnetic assembly is an axial flux magnetic assembly.

In addition to one or more of the features described herein, or as an alternative, further embodiments of the aircraft environmental control systems may include that the first wheel assembly is a turbine and the second wheel assembly is a fan.

In addition to one or more of the features described herein, or as an alternative, further embodiments of the aircraft environmental control systems may include that the first wheel assembly is a turbine and the second wheel assembly is a compressor.

In addition to one or more of the features described herein, or as an alternative, further embodiments of the aircraft environmental control systems may include at least one mounting structure arranged to fixedly mount the stator assembly to the housing.

In addition to one or more of the features described herein, or as an alternative, further embodiments of the aircraft environmental control systems may include a controller configured direct electrical power into the stator assembly to generate a magnetic field.

In addition to one or more of the features described herein, or as an alternative, further embodiments of the aircraft environmental control systems may include at least one mechanical bearing arranged on the shaft.

The foregoing features and elements may be combined in various combinations without exclusivity, unless expressly indicated otherwise. Features which are described in the context of separate aspects and embodiments may be used together and/or be interchangeable. Similarly, features described in the context of a single embodiment may also be provided separately or in any suitable subcombination. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The subject matter is particularly pointed out and distinctly claimed at the conclusion of the specification. The foregoing and other features, and advantages of the present disclosure are apparent from the following detailed description taken in conjunction with the accompanying drawings in which:

DETAILED DESCRIPTION

Figure 1:
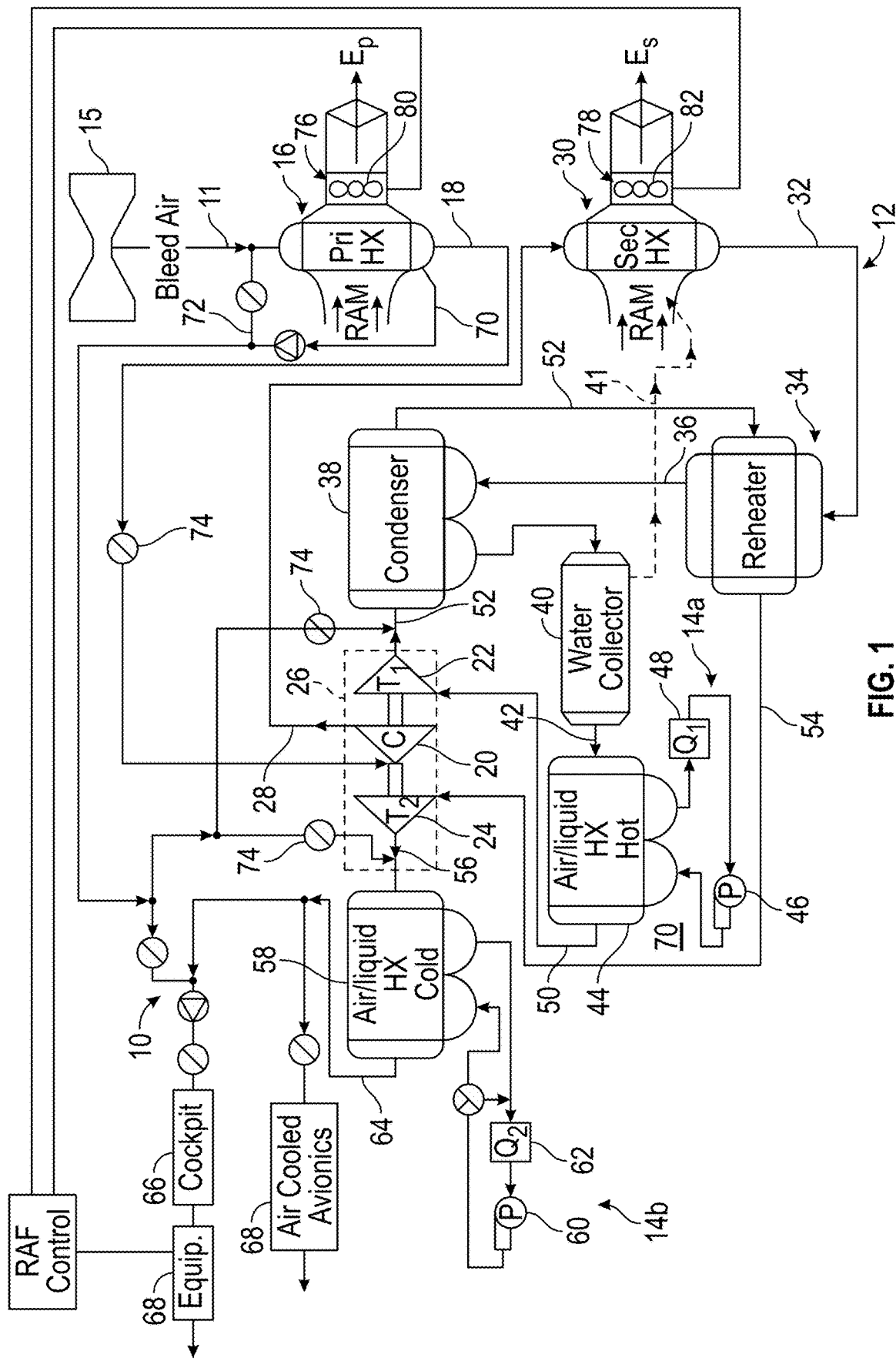
FIG. 1 is a schematic diagram of an environmental control system that may incorporate embodiments of the present disclosure.

FIG. 1 illustrates a general schematic view of an environmental control system (ECS) 10 for an aircraft that may incorporate embodiments of the present disclosure. The ECS 10 includes an air cycle subsystem 12 that is in a heat exchange relationship with a liquid cycle subsystem 14a, 14b. It should be understood that although two separate liquid subsystems 14a, 14b are illustratively shown, other configurations, such as a single substantially continuous subsystem, may also benefit from embodiments of the present disclosure.

In operation of the ECS 10, bleed air 11 may be received from a gas turbine engine 15. The bleed air 11 is sent through a primary heat exchanger 16 such that the bleed air 11 is in heat exchange relationship with RAM or ambient air. The primary heat exchanger 16 may be configured as an air-to-air exchanger. After the bleed air 11 is cooled in the primary heat exchanger 16, the resulting cooler air is communicated through a passage 18 which communicates with a compressor 20 where the air is compressed to a high pressure. The compressor 20 may be arranged or located upon a common shaft with a first turbine 22 and a second turbine 24. The compressor 20, the first turbine 22, and the second turbine 24 may define an air cycle machine (ACM) 26.

The high pressure compressed air exits the compressor 20 through a passage 28 which communicates with a secondary heat exchanger 30. The secondary heat exchanger 30 may be configured as an air-to-air exchanger which may cool the compressed air by heat exchange with a RAM air flow. Compressed, cooled and water vapor carrying air exits the secondary heat exchanger 30 and flows through a duct 32 which communicates with a reheater 34. The reheater 34 is configured to cool the water vapor carrying air which exits the reheater 34 through a passage 36. Passage 36 communicates with a condenser 38 which further cools the water vapor carrying air by condensing and separating the water in a water extractor 40. As the water vapor carrying air is passed directly from the reheater 34 to the condenser 38, the water from the water vapor condenses relatively easily, and the air may be dehumidified.

The dehumidified air exits the extractor 40 and is communicated through a passage 42 to a first air-liquid heat exchanger 44. The first air-liquid heat exchanger 44 is part of the air cycle subsystem 12 and the liquid cycle subsystem 14a to form a heat exchange relationship therebetween. Moreover, moisture which may remain in the air is removed as the temperature of the air is increased by passage through the first air-liquid heat exchanger 44. The liquid cycle subsystem 14a may be configured as a closed system and utilize a liquid coolant, such as polyalphaolephin (PAO), which is cycled by a pump 46 or the like. The liquid coolant functions as a coolant medium for a heat load 48 and as a heat source for the dehumidified air which is passed through passage 42. The heat load 48 is typically an avionics subsystem which generates a rather large amount of heat—typically around 160 degrees Fahrenheit. The heat exchange process therein between the liquid coolant in the liquid cycle subsystem 14a and the air communicated through passage 42 cools the liquid, removes heat from the load 48, and heats the air exiting the first air-liquid heat exchanger 44.

Dehumidified heated air exits the first air-liquid heat exchanger 44 through a passage 50 which communicates with the first turbine 22. The air is expanded through the first turbine 22 of the ACM 26 between an inlet pressure of the first turbine 22 and an outlet pressure of the second turbine 24. The first turbine 22 is configured to assist in condensing any water vapor which may still be in the air as a result of the air being expanded and thus cooled. The recovered heat from the first air-liquid heat exchanger 44 is used by the first turbine 22, for example, to increase a rotating speed of the first turbine 22, boost a pressure ratio of the first turbine 22, increase a power of the first turbine 22, and/or increase an expansion of the reheated air through the first turbine 22. The first turbine 22 may be mechanically engaged to the compressor 20 and the second turbine 24. Thus, heat or energy absorbed by the first turbine 22 may be converted to useful energy by the compressor 20.

The discharge pressure from the first turbine 22 may be maintained such that a discharge temperature is maintained just above freezing (e.g., mid-pressure) so that outlet air from the first turbine 22, which passes through a passage 52, operates as a heat sink for the condenser 38 and the reheater 34. The heated air exits the reheater 34 through a passage 54 which communicates with the second turbine 24 of the ACM 26. The recovered heat from the condenser 38 and the reheater 34 is used by the second turbine 24, for example, to increase a rotating speed of the second turbine 24, boost a pressure ratio of the second turbine 24, increase a power of the second turbine, and/or increase an expansion of the reheated air. Thus, the performance of both the first turbine 22 and the second turbine 24 may be improved from otherwise wasted energy. Moreover, the increased turbine cooling advantageously allows the minimization of size and/or weight of the heat exchangers.

The air is expanded through the second turbine 24 of the ACM 26. The discharge pressure from the second turbine 24 may be maintained such that a discharge temperature is maintained just below freezing. The second turbine 24 outlet air passes through a passage 56 which communicates with a second air-liquid heat exchanger 58. The second air-liquid heat exchanger 58 forms part of the air cycle subsystem 12 and the liquid cycle subsystem 14b to form a heat exchange relationship therebetween. The liquid cycle subsystem 14b may be configured as a closed system, such as described above with respect to the liquid cycle subsystem 14a. The liquid coolant of the liquid cycle subsystem 14b is cycled by a pump 60 and functions as a coolant medium for a second heat load 62. An operating temperature of the second heat load 62 is preferably lower than the operating temperature of the first heat load 48—typically around 75 degrees Fahrenheit—but also cools other downstream heat loads. It should be understood that the operating temperatures of the heat loads are representative and other operating temperatures will also be applicable to the present invention.

The heat exchange process therein between the liquid coolant in the liquid cycle subsystem 14b and the air communicated through passage 56 cools the liquid, removes heat from the load 62, and heats the air exiting the second air-liquid heat exchanger 58. The relatively warmer air exits second air-liquid heat exchanger 58 through a passage 64 which communicates with a cockpit 66 (or cabin) and/or other air loads 68 to provide cooling air therefor. In the event that it is desired to modulate the supply from the first turbine 22, the second turbine 24, the cockpit 66 (or cabin), and/or the air loads 68, a temperature control passage 70, 72 is configured to communicate directly with bleed air 11 prior to and/or subsequent to the primary heat exchanger 16. Control valves 74 may be arranged or located just downstream of the first turbine 22 and the second turbine 24 of the ACM 26, and just upstream of the cockpit 66 (or cabin) and/or the air loads 68 to allow warm air mixture therewith. Operation of such control valves may be implemented by a microprocessor based electronic control system.

The primary heat exchanger 16 and the secondary heat exchanger 30 preferably include a respective primary RAM air fan (RAF) system 76 and a secondary RAM air fan (RAF) system 78. Notably, the RAF systems 76, 78 are located downstream of the respective heat exchangers 16, 30 in the RAM exhaust (illustrated schematically by arrows Ep, Es) such that temperature rise across the RAF system 76, 78 will not impact ECS performance. Each RAF system 76, 78 includes an electric motor 80, 82 such that each RAF system 76, 78 is driven at a speed independent of the ACM 26 which reduces generated noise and increases overall operating efficiency. Furthermore, as each RAF system 76, 78 may be driven by the independent RAF electric motors 80, 82, the RAF systems 76, 78 may be located or installed in the ECS systems 10 as self-contained systems, such as Line Replaceable Units (LRUs) which simplifies maintenance, improves reliability and performance while decreasing system weight.

Figure 2:
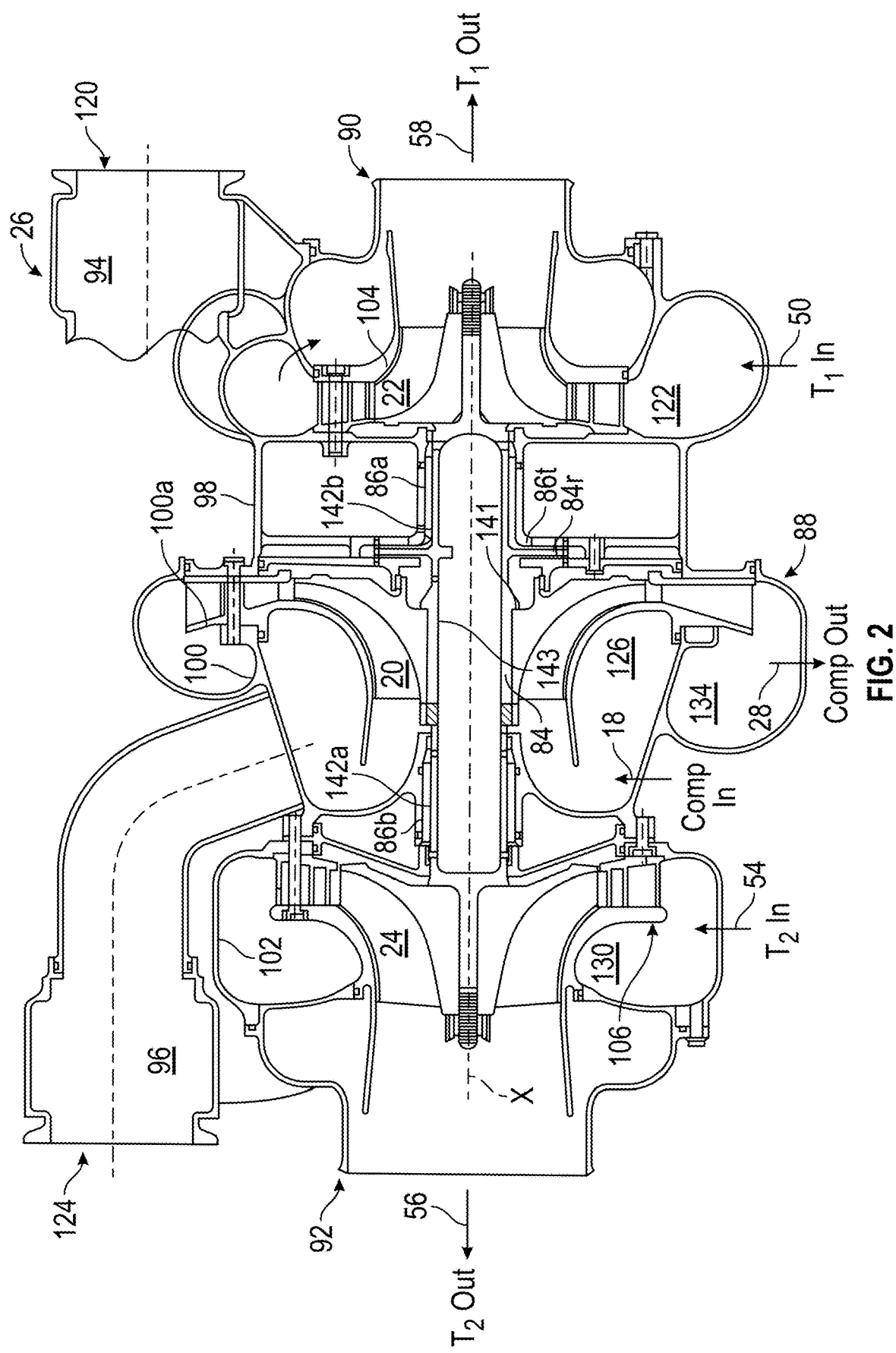
FIG. 2 is a schematic illustration of an air cycle machine that may incorporate embodiments of the present disclosure.

Referring now to FIG. 2, a more detailed schematic illustration of the ACM 26 is shown. In the ACM 26, the compressor 20 is arranged upon a common shaft 84 between the first turbine 22 and the second turbine 24 for rotation about an axis of rotation X. The shaft 84 may define or include an internal cavity 143, which reduces the weight of the shaft 84. The shaft 84 may define one or more journal bearing surfaces 142a, 142b with a desired tolerance. The journal bearing surfaces 142a, 142b may minimize loads on the shaft 84 and may aid in alignment of hydrodynamic foil bearings 86a, 86b that support the shaft 84. Reduction of shaft 84 loads due to imbalance may also increase the performance and reliability of the ACM 26.

The shaft 84 is supported on hydrodynamic foil bearings 86a, 86b, 86t which are reacted by an ACM housing 88. The first turbine 22 and the second turbine 24 are arranged outboard on each end of the ACM 26. This outboard arrangement may be achieved by moving the RAF systems 76, 78 from the ACM 26 and locating the RAF systems 76, 78 elsewhere in the ECS system 10 (FIG. 1). Further, the compressor 20 is located between the first turbine 22 and the second turbine 24. This arrangement enables bypass circuits 94, 96 that communicate with the first turbine 22 and the second turbine 24, respectively, to be less circuitous and thereby more efficient compared to other ACM configurations. This use of the outboard-located turbines 22, 24 results in a high efficiency with each turbine 22, 24 using a respective straight axial outlet diffuser 90, 92. The ACM housing assembly 88 includes a first turbine housing portion 98, a compressor housing portion 100, a second turbine housing portion 102, a first turbine outlet portion 104, and a second turbine outlet 106 portion). The housing portions 98, 100, 102, 104, 106 may be connected together using fasteners or otherwise coupled together. The hydrodynamic foil bearing 86a supports the shaft 84 within the first turbine housing portion 98. The hydrodynamic foil bearing 86b supports the shaft 84 within the compressor housing portion 100. A hydrodynamic foil thrust bearing 86t is arranged between a radially extending flange portions of the shaft 86.

As shown, in this configuration, a low limit bypass valve port 120 directly communicates with a first turbine inlet 122. Further, an auxiliary ground unit (AGU) bypass valve port 124 directly communicates with a compressor inlet 126. By combining the valve ports 120, 124 into the ACM 26, a lightweight, high efficiency design is obtained. The first turbine inlet 122, a second turbine inlet 130, and the compressor inlet 126 are at least partially wound around the ACM axis X. That is, the first turbine inlet 122, the second turbine inlet 130, and the compressor inlet 126 are formed into the respective housing portions 98, 100, 102, 104, 106 to smoothly direct airflow in a tangential path toward the first turbine 22, the second turbine 24, and the compressor 20. A compressor outlet 134 also extends at least partially around the compressor housing portion 100 to smoothly direct airflow out of the compressor 20 in a tangential direction. The compressor inlet 126 and the compressor outlet 134 may be arranged and directed in a common direction to provide for a compact ACM packaging arrangement. The addition of the valve ports 120, 124 into the ACM 26 hosing portions 98, 100, 102, 104, 106 also results in a weight reduced design due to increase bypass efficiencies and simplified installations.

As discussed above, the motors of the RAF systems may be arranged separate from the ACM. However, it may be beneficial to incorporate a motor into the ACM, such as to drive rotation of the shaft (e.g., driving rotation of the turbines and/or compressor). That is, in accordance with embodiments of the present disclosure, a motor may be incorporated into the ACM to provide supplemental power to drive the turbines or compressors of the ACM. In accordance with embodiments of the present disclosure, the motor incorporated into the ACM may be a bearingless motor. Such a motor may incorporate an integrated or inherent magnetic bearing (e.g., levitation) functionality, which may enable the elimination of mechanical bearings of ACMs or may be provide backup or secondary bearing functionality in the event of a failed mechanical bearing (e.g., thrust bearings, journal bearings, hydrodynamic foil bearings, etc.).

Figure 3:
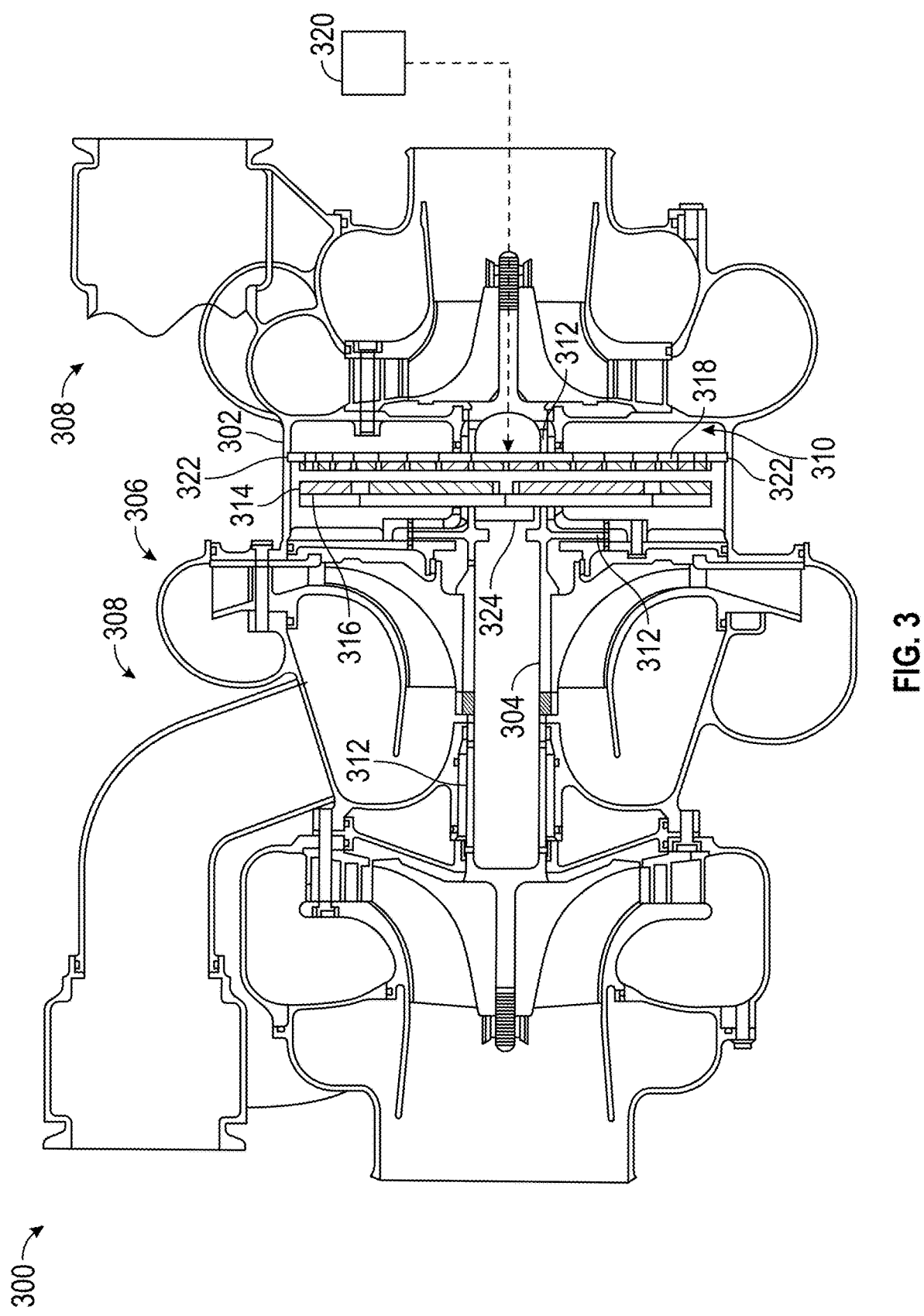
FIG. 3 is a schematic illustration of an air cycle machine in accordance with an embodiment of the present disclosure, incorporating an axial flux motor.

Referring now to FIG. 3, a schematic illustration of an air cycle machine 300 in accordance with an embodiment of the present disclosure are shown. The air cycle machine 300 may be configured substantially similar to that shown and described above with respect to FIG. 2, and thus like features will not be described again. The air cycle machine 300 may be incorporated into and arranged as part of an environmental control system of an aircraft (e.g., FIG. 1). The air cycle machine 300 includes a housing 302 that may be a single structural housing or formed from two or more housing portions (e.g., as described above). The housing 302 may define various structural walls and the like for turbines and/or compressors of the air cycle machine 300. A shaft 304 is arrange within the housing 302 and is configured to rotate within the housing 302 to drive rotation of a compressor 306 and/or turbine(s) 308 or may be rotationally driven by the turbines to drive rotation of the compressor. The housing 302 includes and defines a motor cavity 310. The motor cavity 310 may be defined within a unitary housing, may be defined within a housing portion of the housing, or may be defined between two housing portions of the air cycle machine 300.

Similar to that described above, one or more mechanical bearings 312 may be arranged on and relative to the shaft 304 to provide bearing surfaces about which the shaft 304 may rotate. The mechanical bearings 312 may include various types of mechanical bearings, such as thrust bearings, journal bearings, and hydrodynamic foil bearings. In accordance with embodiments of the present disclosure, a motor 314 is arranged within the housing 302 of the air cycle machine 300. A part of the motor 314 (e.g., a rotor assembly) may be operably coupled to the shaft 304 to input rotationally energy into the shaft 304 to supplement or augment a power input that may be provided by one or more turbines of the air cycle machine 300.

The motor 314 may be an axial flux motor configured to generate an electromagnetic field and may interact with the shaft 304 to cause rotation of the shaft 304. The motor 314 includes a motor rotor assembly 316 and a motor stator assembly 318. The motor rotor assembly 316 may be fixedly coupled to the shaft 304, and the motor stator assembly 318 may be fixedly coupled to the housing 302. The motor stator assembly 318 may comprise a set of electromagnetic windings or stator windings. The stator windings may be electrically coupled to a motor controller 320 that is configured to supply an electrical current into the windings of the motor stator assembly 318 to generate an electromagnetic field. The electromagnetic field of the motor stator assembly 318 will interact with the motor rotor assembly 316. The motor rotor assembly 316, coupled to the shaft 304, will rotate in response to the application of the electromagnetic field from the motor stator assembly 318, and thus impart rotational energy into the shaft 304.

As shown in FIG. 3, the motor stator assembly 318 may be fixedly coupled to the housing 302 by one or more mounting structures 322. The mounting structures 322 may be brackets, fasteners, or other types of attachment mechanisms. In some embodiments, the mounting structures 322 may be integrally formed with the housing 302, and in still further embodiments, a back iron or support frame from the stator windings may be integrally formed with the housing 302. Similar attachment mechanisms or structures may be employed to connect and mount the motor rotor assembly 316 to the shaft 304.

The connection between the motor rotor assembly 314 and the shaft 304 may be selectively engageable and disengageable. For example, a clutch assembly 324 may physically connect the motor rotor assembly 314 to the shaft 304, and the clutch assembly 324 may be selectively operable to rotationally connect the motor rotor assembly 314 to the shaft 304 or to rotationally disconnect the motor rotor assembly 314 from the shaft 304. In the rotationally connected state, by applying a magnetic field from the motor stator assembly 318, the motor rotor assembly 316 will input rotational energy into the shaft 304 (or may enable extraction of work therefrom). However, in the rotationally decoupled or disconnected state, when a magnetic field is induced by the motor stator assembly 318, the motor rotor assembly 316 may operate as a magnetic bearing.

That is, the motors of air cycle machines, as described herein, may have at least two operational modes. A first operational mode may be a power input mode, where the motor stator assembly 318 causes rotation in the motor rotor assembly 316 to drive rotation of the shaft 304. A second operation mode may be a power output mode, where rotation of the shaft 304 causes rotation of the motor rotor assembly 316 which may induce an electrical current within the motor stator assembly 318, and the motor controller 320 may supply the generated electrical power to other electrical systems of the aircraft. A third operation mode may be a bearing mode. In the bearing mode of operation, the motor rotor assembly 316 may be rotationally decoupled from the shaft 304, may remain physically coupled to the shaft 304. In this state, the application of a magnetic field by the motor stator assembly 318 may provide a bearing functionality (e.g., axial bearing in the configuration of FIG. 3), where power is neither input nor output from the shaft 304. It will be appreciated that in the power input mode and/or the power output mode of operation, the motor may provide bearing functionality in such power input/output modes of operation.

Figure 4:
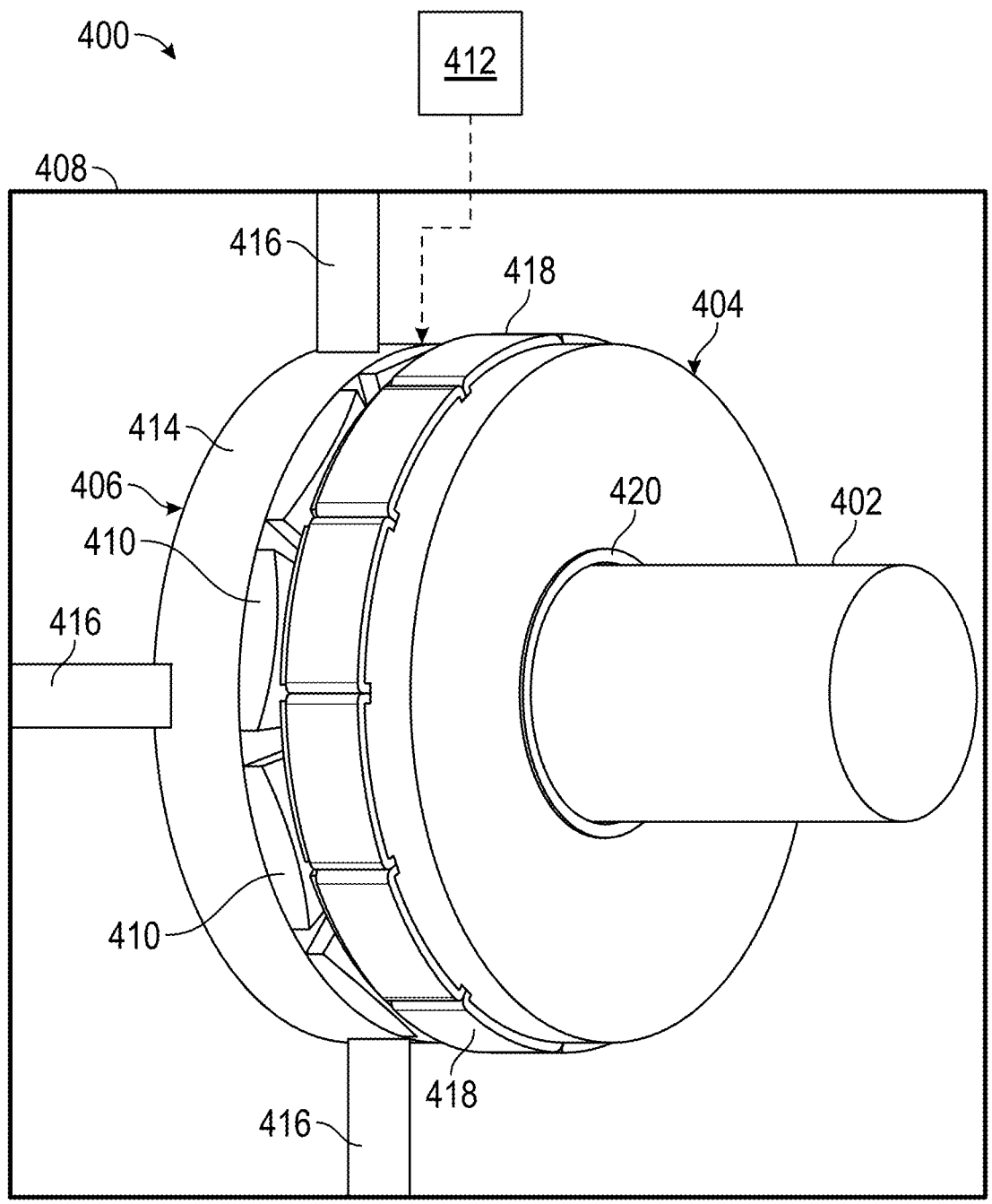
FIG. 4 is a schematic illustration of a portion of an air cycle machine in accordance with an embodiment of the present disclosure, incorporating an axial flux motor.

Referring now to FIG. 4, a motor 400 of an air cycle machine configured as an axial flux motor is illustrated. The motor 400 may be configured to generate an electromagnetic field and may interact with a shaft 402 of the air cycle machine to cause rotation of the shaft 402. The motor 400 includes a motor rotor assembly 404 and a motor stator assembly 406. The motor rotor assembly 404 may be fixedly coupled to the shaft 402, and the motor stator assembly 406 may be fixedly coupled to a housing 408 of the air cycle machine. The motor stator assembly 406 may comprise a set of electromagnetic windings or stator windings 410. The stator windings 410 may be electrically coupled to a motor controller 412 that is configured to supply an electrical current into the stator windings 410 of the motor stator assembly 406 to generate an electromagnetic field. The electromagnetic field of the motor stator assembly 406 will interact with the motor rotor assembly 404. The motor rotor assembly 404, coupled to the shaft 402, will rotate in response to the application of the electromagnetic field.

The stator windings 410 may be mounted to a stator frame 414. The stator frame 414 may be fixedly coupled to the housing 408 of the air cycle machine by one or more mounting structures 416. The mounting structures 416 may be brackets, fasteners, or other types of attachment mechanisms. In some embodiments, the mounting structures 416 may be integrally formed with the housing 408. In some embodiments, the stator frame 414 may be integrally formed with the housing 406.

The motor rotor assembly 404 may be formed from a set of magnets 418 that are coupled to the shaft 402. The magnets 418 of the motor rotor assembly 404 may be arranged within the shaft 402, arranged on an exterior surface of the shaft 402, integrated into the structure of the shaft 402, or otherwise physically coupled to the shaft 402 such that when a magnetic field is applied by the stator motor assembly 406 to the motor rotor assembly 404, rotation of the motor rotor assembly 404 will cause rotation of the shaft 402. In this illustrative configuration, an optional mechanical bearing 420 is arranged radially between the magnets 418 of the motor rotor assembly 404 and the shaft 402. In other configurations, the mechanical bearing 420 may be arranged radially outward from the magnets 418 of the motor rotor assembly 404. Similar to the embodiment of FIG. 3, a clutch assembly may be provided to selectively coupled/decouple the motor rotor assembly 404 into and out of rotationally engagement with the shaft 402.

Figure 5:
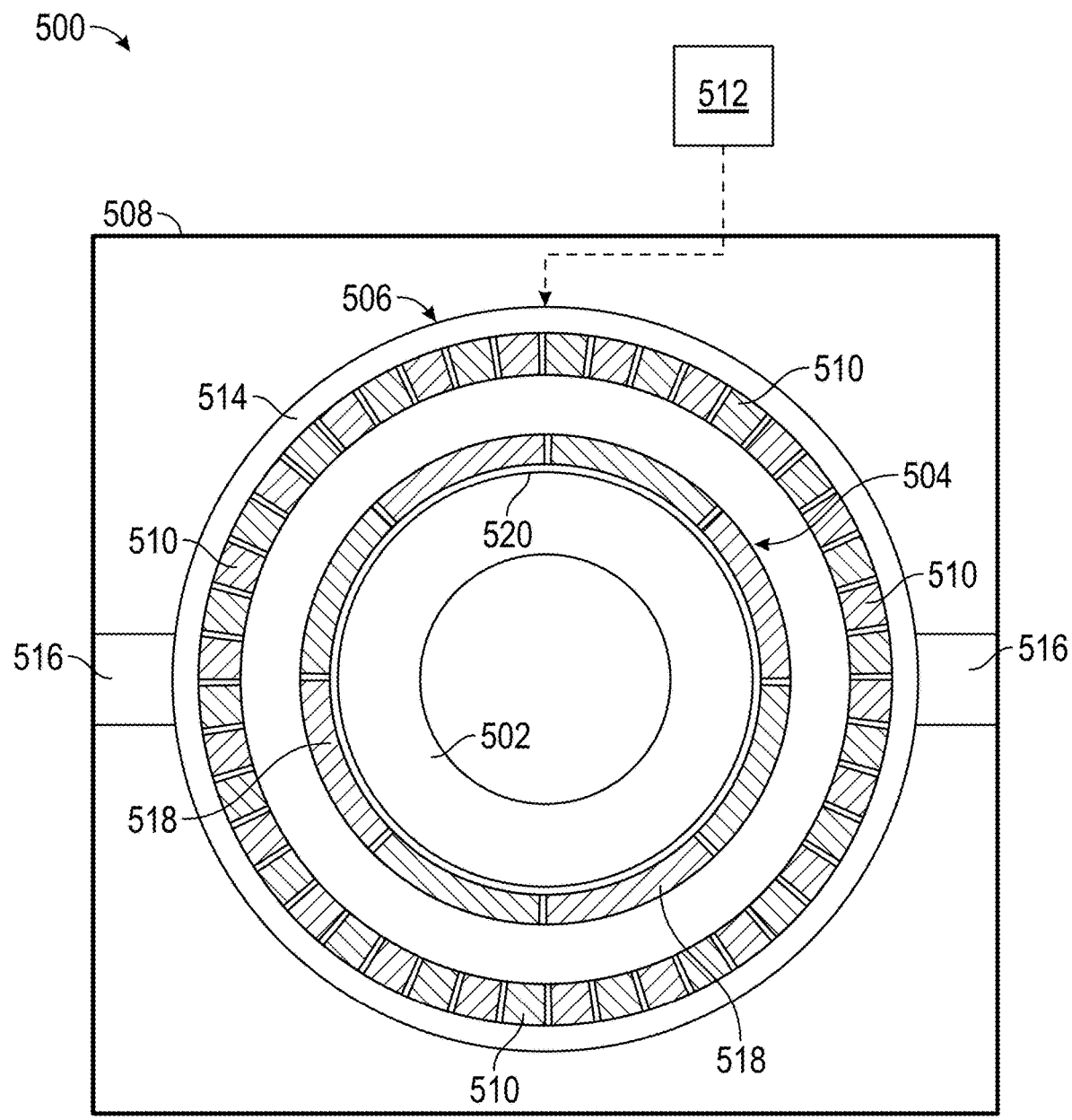
FIG. 5 is a schematic illustration of a portion of an air cycle machine in accordance with an embodiment of the present disclosure, incorporating a radial flux motor.

Referring now to FIG. 5, a motor 500 of an air cycle machine configured as a radial flux motor is illustrated. The motor 500 may be configured to generate an electromagnetic field and may interact with a shaft 502 of the air cycle machine to cause rotation of the shaft 502. The motor 500 includes a motor rotor assembly 504 and a motor stator assembly 506. The motor rotor assembly 504 may be fixedly coupled to the shaft 502, and the motor stator assembly 506 may be fixedly coupled to a housing 508 of the air cycle machine. The motor stator assembly 506 may comprise a set of electromagnetic windings or stator windings 510. The stator windings 510 may be electrically coupled to a motor controller 512 that is configured to supply an electrical current into the stator windings 510 of the motor stator assembly 506 to generate an electromagnetic field. The electromagnetic field of the motor stator assembly 506 will interact with the motor rotor assembly 504. The motor rotor assembly 504, coupled to the shaft 502, will rotate in response to the application of the electromagnetic field.

The stator windings 510 may be mounted to a stator frame 514. The stator frame 514 may be fixedly coupled to the housing 508 of the air cycle machine by one or more mounting structures 516. The mounting structures 516 may be brackets, fasteners, or other types of attachment mechanisms. In some embodiments, the mounting structures 516 may be integrally formed with the housing 508. In some embodiments, the stator frame 514 may be integrally formed with the housing 506.

The motor rotor assembly 504 may be formed from a set of magnets 518 that are coupled to the shaft 502. The magnets 518 of the motor rotor assembly 504 may be arranged within the shaft 502, arranged on an exterior surface of the shaft 502, integrated into the structure of the shaft 502, or otherwise physically coupled to the shaft 502 such that when a magnetic field is applied by the stator motor assembly 506 to the motor rotor assembly 504, rotation of the motor rotor assembly 504 will cause rotation of the shaft 502. In this illustrative configuration, an optional mechanical bearing 520 is arranged radially between the magnets 518 of the motor rotor assembly 504 and the shaft 502. In other configurations, the mechanical bearing 520 may be arranged radially outward from the magnets 518 of the motor rotor assembly 504. Similar to the embodiment of FIG. 3, a clutch assembly may be provided to selectively coupled/decouple the motor rotor assembly 504 into and out of rotationally engagement with the shaft 502.

In each of the configurations of FIGS. 3-5, a motor is integrated into and installed within a housing of an air cycle machine of an environmental control system of an aircraft. The motors employed in embodiments of the present disclosure are induction motors that employ a stator-rotor configuration and an induced magnetic field to drive rotation of the motor rotor assembly, and the shaft of the ACM that is fixedly connected to the motor rotor assembly. These motors are thus bearingless motors that incorporate an integrated magnetic bearing (levitation) functionality. Such magnetic bearing functionality can eliminate the need for lubrication and sealing that is typically and conventionally required for mechanical bearings. Because no particles are generated between the rotor and the stator due to the contact-free bearing, the stator can be sealed hermetically.

Accordingly, in accordance with embodiments of the present disclosure, the motor that is incorporated into the ACM may be serve multiple functions. For example, one function of the motors described herein is to impart additional power or rotational energy into the shaft of the ACM. As such, additional power may be supplied into the ACM without taking up additional space and the efficiencies improvements achieved through motor-augmentation of rotation of the shaft may offset the increased weight that is the result of installing the motor into the ACM housing. Another functionality maybe to extract work or power from the ACM. For example, in some configurations, the rotation of the shaft with the associate motor rotor assembly may cause a magnetic field to be generated and induce a current within the windings of the motor stator assembly. Accordingly, the associated motor controllers may be configured to operate in reverse to extract power from the ACM.

Further, the motors of the ACM may provide non-electrical power functionality. For example, the motors may be used as bearings or back-up bearings for the ACM systems. That is, the magnetic fields employed by the motors to induce rotation (e.g., to input work or extract work from the rotational shaft of the ACM), may also be employed as a bearing. That is, the motors may provide axial and/or radial bearing functionality to the ACM, such that the motor may be used as a redundancy contactless bearing. In the configuration of FIGS. 3-4, the axial flux motor may provide an axial bearing functionality, ensuring the axial position of the shaft is maintained, even if mechanical axial bearings fail or otherwise cannot provide sufficient functionality as intended. In the configuration of FIG. 5, the radial flux motor may provide a radial bearing functionality, ensuring the radial position of the shaft is maintained. In some configurations, in accordance with embodiments of the present disclosure, a motor having both radial and axial flux may be incorporated into an ACM and thus provide both radial and axial bearing functionality.

The bearing functionality of the motors of the present disclosure may be provided during motor operation (e.g., input or extracting energy from the shaft) or even when the motor is in an off state or in a state of no power input/output. That is, by including a clutch assembly, as described above, the motors may operate in a passive mode where a magnetic field is induced to have the motor operate as a magnetic bearing, even when not rotationally coupled to the shaft. It will be appreciated that such a bearing functionality may also be provided during power input/output modes of operation.

Furthermore, in accordance with some embodiments of the present disclosure, the integrated magnetic assemblies may be configured as gearing systems of the air cycle machines. That is, in some embodiments, the magnetic motors described above may be configured with additional functionality to provide gearing within the systems to which they are incorporated. In addition or alternatively, in some embodiments magnetic gearing may be provided without a motor functionality (e.g., motor functionality may be omitted or provided by a separate structure/system).

Figure 6:
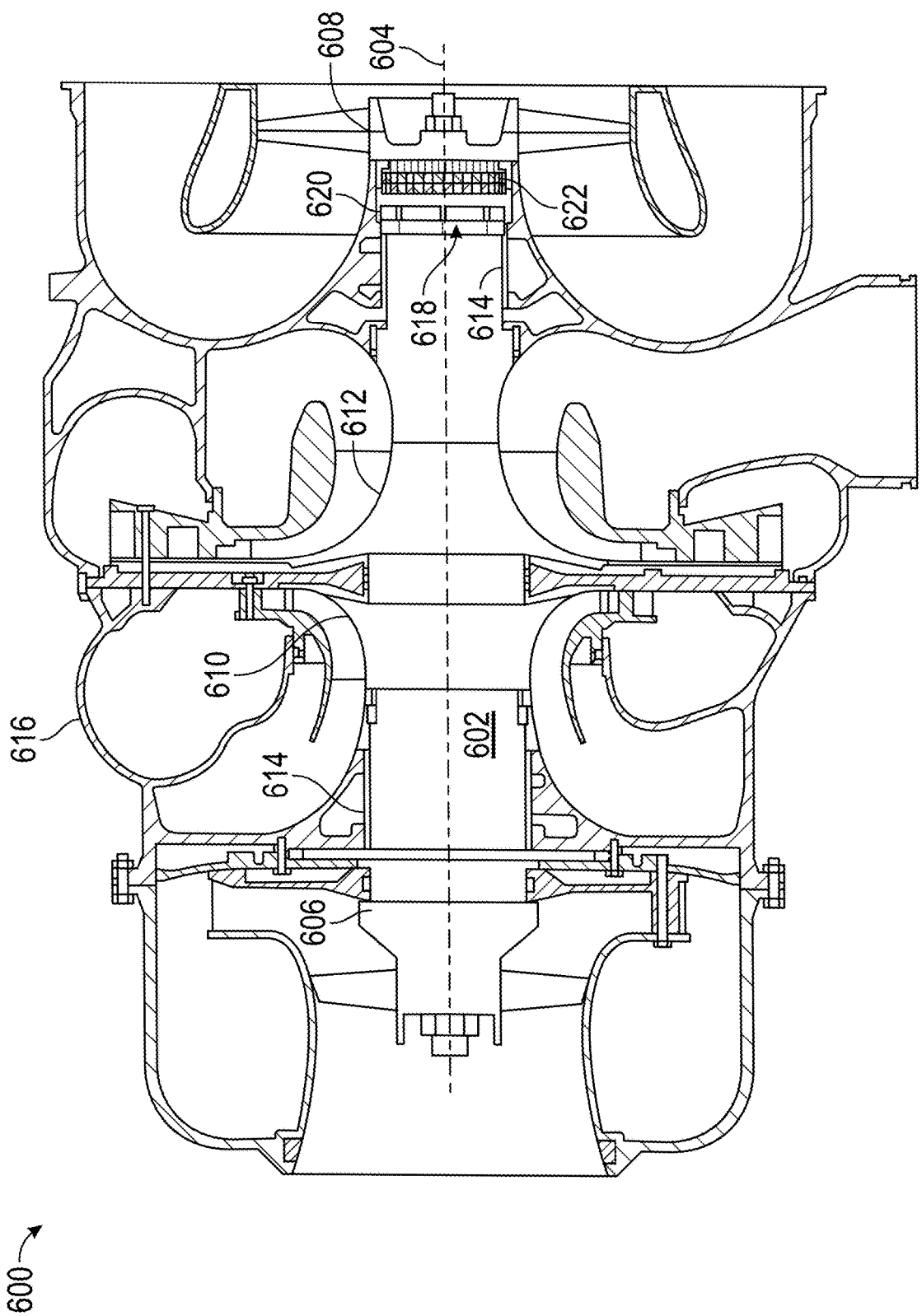
FIG. 6 is a schematic illustration of an air cycle machine in accordance with an embodiment of the present disclosure.

Referring now to FIG. 6, an air cycle machine 600 having a four-wheel configuration coaxially disposed along a common shaft 602 for rotation about a common longitudinal axis 604. In this illustrative configuration, a first-wheel assembly 606 is mounted to a first end portion of the shaft 602 for rotation therewith. A second-wheel assembly 608 is mounted at a second end portion of the shaft 602 for rotation therewith. A third-wheel assembly 610 is mounted to a central portion of the shaft 602 in spaced relationship from the first-wheel assembly 606 at one end of the shaft 602 and the second wheel assembly 608 at the other end of the shaft 602 for rotation therewith. A fourth-wheel assembly 612 is mounted to the central portion of the shaft 602 for rotation therewith. The fourth-wheel assembly 612 is arranged in adjacency or back-to-back relationship with the third-wheel assembly 610 and arranged between the second-wheel assembly 608 and the third wheel assembly 610. The shaft 602 is supported for rotation about the longitudinal axis 604 on one or more bearings 614 supported in a housing 616. The housing 616 is configured to support the bearing 614 and to provide appropriate inlet ducts and outlet ducts for the supply of working fluid to and the discharge of working fluid from each of the four-wheel assemblies 606, 608, 610, 612.

At least one the four-wheel assemblies 606, 608, 610, 612 mounted to the shaft 602 may be configured for rotation therewith and is operative to extract energy from a flow of pressurized gaseous fluid, such as compressed air, for driving the shaft 602 in rotation about the longitudinal axis 604. One of the two wheel assemblies mounted to the central portion of the shaft 602 (e.g., the third-wheel assembly 610) may be arranged as a compressor rotor that operative to compress a flow of gaseous working fluid and the other of the central wheel assemblies (e.g., the fourth-wheel assembly 612) may be configured as a turbine rotor operative to expand the gaseous working fluid compressed via the compressor rotor (e.g., the third-wheel assembly 610) the thereby extracting energy therefrom so as to drive the shaft 602 in rotation about the axis 604. In this configuration, the two outer wheel assemblies (e.g., first-wheel assembly 606 and second-wheel assembly 608) may each comprise a fan rotor. In other embodiments, the first- or second-wheel assembly 606, 608 may be configured as an additional turbine rotor of the air cycle machine 600 and the other of the first or second wheel assembly 606, 608 may be configured as a fan rotor. Still further, in some embodiments, the first- or second-wheel assembly 606, 608 may comprise an additional turbine rotor and the other of the first- or second-wheel assembly 606, 608 may be configured as an additional compressor rotor. It will be appreciated that the wheel assemblies of air cycle machines of the present disclosure may be arranged in any rotor combination having at least one turbine rotor arranged to extract sufficient energy from the gaseous working fluid expanded therein to drive the shaft 602, and the other wheel assemblies (e.g., arranged as fans or compressors) are arranged in rotation therewith about the axis 604.

Furthermore, as shown, the air cycle machine 600 may include a magnetic assembly 618 arranged within the housing 616, similar to that shown and described above. The rotation of the shaft 602 may be augmented (e.g., power input) by the magnetic assembly 618. The magnetic assembly 618 may be an axial flux assembly configured to generate an electromagnetic field and may interact with the shaft 602 to cause rotation of the shaft 602. The magnetic assembly 618 includes a rotor assembly 620 and a stator assembly 622. The rotor assembly 620 may be fixedly and rotationally coupled to the shaft 602, and the stator assembly 622 may be fixedly coupled to the housing 616. The stator assembly 622 may comprise a set of electromagnetic windings or stator windings. The stator windings may be electrically coupled to a controller (e.g., as shown and described above) that is configured to supply an electrical current into the windings of the stator assembly 622 to generate an electromagnetic field. The electromagnetic field of the stator assembly 622 will interact with the rotor assembly 620. The rotor assembly 620, coupled to the shaft 602, will rotate in response to the application of the electromagnetic field from the stator assembly 620, and thus impart rotational energy into the shaft 602.

The various wheel assemblies 606, 608, 610, 612 of the air cycle machine 600 may have different optimum Ns and rotational speeds for peak efficiency of the air cycle machine 600. Due to thermodynamic system conditions, it may be difficult (or impossible) to design each wheel assembly 606, 608, 610, 612 at the peak efficiency (Ns). Because of this, there may be significant losses in performance (e.g. up to 10% of an efficiency of the fan(s)) and thus result in a corresponding increase in heat exchanger and overall machine weight.

In accordance with some embodiments of the present disclosure, the magnetic assembly 618 may be configured as an electric gearbox that is arranged within the housing 616 of the ACM 600. Such a configuration may allow for different rotational speeds of the different wheel assemblies 606, 608, 610, 612, such as different rotational speeds for turbine assemblies, compressor assemblies, and/or fan assemblies of the ACM 600. In accordance with some embodiments, the gearing functionality may be provided with magnetic bearings, air bearings, or motor-integrated bearings, such as described above. By employing a magnetic assembly, as described herein, the fan speed may be varied to ensure not only optimum efficiency on the ground for the ACM 600 (and for the aircraft operation) but also, minimum losses during cruise operation may be provided by disengaging the fan through decoupling of the wheel assemblies 606, 608, 610, 612 and/or the magnetic assembly 618.

To provide such gearing functionality, the magnetic assembly 618 may be configured with permanent magnets that are configured to transmit torque between an input (e.g., stator assembly) and an output (e.g., rotor assembly) without mechanical contact. Torque densities comparable to mechanical gears in similarly configured ACMs may be able to achieve an efficiency of 99% or greater at full load an much high part load efficiencies than a mechanical gear (e.g., requiring contact surfaces, lubrication, cooling, etc.).

As such, in accordance with an example embodiment of the present disclosure, the magnetic assembly 618 may be configured as a magnetic gear system. Permanent magnets and/or electromagnets may be employed. In the case of permanent magnets, a specific gear ratio change may be fixed. However, by using an electromagnetic assembly, the current input to a stator assembly may be varied to achieve a changeable gear ratio. Magnetic gear couplings, in accordance with embodiments of the present disclosure, can be configured in several different configurations. For example, and without limitation, the magnetic assembly 618 may be arranged with parallel input and output axes, similar to spur gears, having magnetic attraction or repulsion between cogs, such as the north pole magnets on the driving gear attracting the south pole magnets of driven gear or north pole cogs on a driving gear tending to center between north pole cogs of the driven gear. In some embodiments, the cogs may be inter meshed to improve coupling. Another configuration may be an in-line axis assembly that use "flux coupling". Although the embodiment shown in FIG. 6 is arranged as a four-wheel configuration, it will be appreciated that ACMs having any wheel-number may benefit from embodiments of the present disclosure. For example, a two-wheel and/or three-wheel ACM systems may also benefit from configurations as shown and described above.

Advantageously, embodiments described herein provide for air cycle machines having integrated magnetic assemblies that may provide power functionality, bearing functionality, and gearing functionality. As such, magnetic assemblies in the form of the motor stator/rotor assemblies can provide high reliability, high precision clearance control, etc. without the need for additional magnetic bearings, physical/contact bearings, and control systems, or mechanical gearing. Further, lower costs and weight savings may be achieved as compared to a system that incorporates both a motor and separate magnetic bearings and/or mechanical bearings and/or gearing systems. The magnetic assemblies described herein may provide, in terms of motor properties, nearly constant rotational speed and a reduction in torque ripples and cogging torque.

Additional benefits of embodiments of the present disclosure may provide for leak proof couplings (e.g., no contact, cooling, or lubrication required). Furthermore, due to the non-contact of the magnetic assemblies described herein, wear ay be limited to only the mechanical bearings of the system (if any), but there is no direct where in a magnetic gearing assembly because there are not mating contact surfaces. Furthermore, advantageously, the magnetic assemblies described herein may provide for interchangeable ratios, which may be changed either electronically or mechanically, and very rapidly (e.g., in minutes not hours).

Furthermore, the magnetic gears described herein provide a magnetic coupling device in an ACM that renders a mechanical ratio between two magnetically-coupled devices such that a ratio of rotation or translational movement between input and output may be unity in the case of a pure magnetic coupling or one of many gear ratios in a magnetic gearbox. Such systems may have a torque or traction limiting factor based on the magnetic coupling force. Further, there are no physical contact surfaces between the main driving and driven elements, and thus wear and attendant systems for prevents/minimizing wear may be eliminated or reduced in such magnetic-based systems.

The use of the terms "a", "an", "the", and similar references in the context of description (especially in the context of the following claims) are to be construed to cover both the singular and the plural, unless otherwise indicated herein or specifically contradicted by context. The modifier "about" used in connection with a quantity is inclusive of the stated value and has the meaning dictated by the context (e.g., it includes the degree of error associated with measurement of the particular quantity). All ranges disclosed herein are inclusive of the endpoints, and the endpoints are independently combinable with each other. As used herein, the terms "about" and "substantially" are intended to include the degree of error associated with measurement of the particular quantity based upon the equipment available at the time of filing the application. For example, the terms may include a range of ±8%, or 5%, or 2% of a given value or other percentage change as will be appreciated by those of skill in the art for the particular measurement and/or dimensions referred to herein.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments.

Accordingly, the present disclosure is not to be seen as limited by the foregoing description but is only limited by the scope of the appended claims.

What is claimed is:

1. An aircraft air cycle machine comprising:
   a housing;
   a shaft arranged within the housing, the shaft comprising a first shaft portion and a second shaft portion;
   a first wheel assembly operably coupled to the first shaft portion and arranged within the housing, wherein the first wheel assembly is configured to rotationally drive the first shaft portion;
   a second wheel assembly operably coupled to the second shaft portion and configured to be rotationally driven by the second shaft portion; and
   a magnetic assembly arranged within the housing and between the first shaft portion and the second shaft portion, wherein the magnetic assembly comprises a stator assembly fixedly connected to the housing and a rotor assembly rotationally coupled to the first shaft portion, wherein the first shaft portion is operably coupled to the second shaft portion by a magnetic gear arrangement of the magnetic assembly that is configured to provide a variable gear ratio between the first wheel assembly and the second wheel assembly such that the first wheel assembly and the second wheel assembly are configured to be selectively driven at different rotational speeds.

2. The aircraft air cycle machine of claim 1, wherein the magnetic assembly is an axial flux magnetic assembly.

3. The aircraft air cycle machine of claim 1, wherein the first wheel assembly is a turbine and the second wheel assembly is a fan.

4. The aircraft air cycle machine of claim 1, wherein the first wheel assembly is a turbine and the second wheel assembly is a compressor.

5. The aircraft air cycle machine of claim 1, further comprising at least one mounting structure arranged to fixedly mount the stator assembly to the housing.

6. The aircraft air cycle machine of claim 1, further comprising a controller configured direct electrical power into the stator assembly to generate a magnetic field.

7. The aircraft air cycle machine of claim 6, wherein the controller is configured to operate in a power input mode of operation to input rotational energy into the shaft.

8. The aircraft air cycle machine of claim 6, wherein the controller is configured to operate in a power output mode of operation to extract energy from the shaft.

9. The aircraft air cycle machine of claim 6, wherein the controller is configured to operate in a bearing mode of operation wherein the rotor assembly is rotationally decoupled from the shaft, and the interaction of the rotor assembly and the stator assembly provides a bearing functionality to the shaft.

10. The aircraft air cycle machine of claim 9, wherein the bearing functionality is at least one of an axial bearing functionality and a radial bearing functionality.

11. The aircraft air cycle machine of claim 1, further comprising at least one mechanical bearing arranged on the shaft.

12. The aircraft air cycle machine of claim 11, wherein the at least one mechanical bearing comprises at least one journal bearing.

13. The aircraft air cycle machine of claim 11, wherein the at least one mechanical bearing comprises at least one thrust bearing.

14. An aircraft environmental control system comprising:
an air cycle machine comprising:
a housing;
a shaft arranged within the housing, the shaft comprising a first shaft portion and a second shaft portion;
a first wheel assembly operably coupled to the first shaft portion and arranged within the housing, wherein the first wheel assembly is configured to rotationally drive the first shaft portion;
a second wheel assembly operably coupled to the second shaft portion and configured to be rotationally driven by the second shaft portion; and
a magnetic assembly arranged within the housing and along between the first shaft portion and the second shaft portion, wherein the magnetic assembly comprises a stator assembly fixedly connected to the housing and a rotor assembly rotationally coupled to the first shaft portion, wherein the first shaft portion is operably coupled to the second shaft portion by a magnetic gear arrangement of the magnetic assembly that is configured to provide a variable gear ratio between the first wheel assembly and the second wheel assembly such that the first wheel assembly and the second wheel assembly are configured to be selectively driven at different rotational speeds.

15. The aircraft environmental control system of claim 14, wherein the magnetic assembly is an axial flux magnetic assembly.

16. The aircraft environmental control system of claim 14, wherein the first wheel assembly is a turbine and the second wheel assembly is a fan.

17. The aircraft environmental control system of claim 14, wherein the first wheel assembly is a turbine and the second wheel assembly is a compressor.

18. The aircraft environmental control system of claim 14, further comprising at least one mounting structure arranged to fixedly mount the stator assembly to the housing.

19. The aircraft environmental control system of claim 14, further comprising a controller configured direct electrical power into the stator assembly to generate a magnetic field.

20. The aircraft environmental control system of claim 14, further comprising at least one mechanical bearing arranged on the shaft.

* * * * *